Oct. 25, 1960     S. J. MANSFIELD     2,957,828

DESICCANT FOR ODOR AND MOISTURE CONTROL

Filed April 4, 1956

INVENTOR.
STANLEY J. MANSFIELD
BY
Homer H. Jamieson
ATTORNEY

United States Patent Office 2,957,828
Patented Oct. 25, 1960

2,957,828

DESICCANT FOR ODOR AND MOISTURE CONTROL

Stanley J. Mansfield, 11837 Laurelwood Drive, Studio City, Calif.

Filed Apr. 4, 1956, Ser. No. 576,042

4 Claims. (Cl. 252—194)

My present invention relates to a new composition of matter in the nature of a desiccant for odor and moisture control, and more particularly to a desiccant which comprises expanded perlite particles having surfaces that are impervious to moisture and that have the surface configurations particularly described hereinbelow, these perlite particles being combined with a deliquescent substance.

My present application is a continuation-in-part of my copending application Serial No. 322,619, filed November 26, 1952, now abandoned, for "Desiccant for Odor and Moisture Control," which in turn was a continuation-in-part of my application Serial Number 123,173, filed October 24, 1949, for "Desiccant for Odor and Moisture Control," now abandoned. These parent applications disclose a desiccant consisting of a combination of perlite particles and a deliquescent material which produces spectacular results in comparison with any other prior art desiccants.

Prior art desiccants include a porous carrier material and a deliquescent material, typical porous carriers being various silica, such as pumice, and bentonites, although numerous other porous materials are used.

One disadvantage of these prior art desiccants which contained a porous carrier material is that concentrations of the deliquescent material were disposed in the pores of these porous carriers. These concentrations of the deliquescent material in the pores caused part of the deliquescent material to be blocked off from the surfaces of the particles so that this portion of the material became useless. Also, these concentrations of the deliquescent material caused the moisture to be attracted only to particular points on the particles. Since the rate of moisture absorption by the desiccant depends upon the amount of surface area of the deliquescent material presented to the moisture laden air, the rate at which the desiccant picked up moisture was seriously limited by these concentrations of the deliquescent material.

Another problem in connection with these most common prior art desiccants was that vapor pressures tended to build up within the porous particles, thus restricting the flow of moisture therein.

Probably the greatest disadvantage in these prior art desiccants containing porous carriers was that when these prior art desiccants became damp, the porous particles adhered together, forming clots, or blocks of the desiccant material. The weight of the moisture absorbed by the desiccant, together with the weight of the relatively heavy prior art desiccant itself, caused the desiccant to pack down and thereby increased this tendency of the prior art desiccants to form into clots, or blocks when they became moist. When prior art desiccants utilizing porous carriers thus formed into clots, air was prevented from circulating throughout the desiccants, so that the material throughout the interior of these clots did not remove any moisture from the atmosphere.

Thus, the disadvantages of prior art desiccants utilizing porous particles as carriers or fillers, all resulted from the structure in these prior art desiccants which prevented all of the deliquescent material used from becoming completely saturated with moisture, and which slowed down the rate at which the deliquescent material was able to remove moisture from the atmosphere.

The perlite particles which I utilize in my composition of matter have surfaces that are impervious to moisture, thus preventing moisture from being soaked up within the particles. The surfaces of my perlite particles are fused in such a manner that the surfaces are rough and highly irregular. These rough, highly irregular surfaces are further interrupted by minute serrations, which are substantially microscopic. Described in another manner, the rough, irregular surfaces of my perlite particles have minute, substantially microscopic serrations disposed or superpositioned thereon.

These rough, serrated surfaces on my perlite particles provide an extremely large surface area for each particle as compared with smooth particles of comparable dimensions. This extremely large surface area, coupled with the particular moisture-holding ability of the finely serrated surfaces, permit my perlite particles to adsorb extremely large quantities of moisture as compared with substantially smooth surfaces, or even rough surfaces, which are not serrated in the manner of my perlite particles.

Prior art mixtures of a deliquescent material and some inert, comminuted material such as glass beads, quartz grains, asbestos, charcoal or the like, utilize the inert, comminuted material solely for the purpose of keeping the deliquescent substance from puddling together, but these inert materials do not actually assist in taking on more moisture. In fact, this type of prior art dessicant will not even take on as much moisture as the most commonly used desiccants, which combined porous carriers or fillers with the deliquescent material. The surfaces of such prior art inert, comminuted materials such as glass beads, quartz grains or the like, hold such a relatively small amount of moisture that they prevent all of the deliquescent material used from becoming evenly nearly completely saturated with moisture.

In view of these and other disadvantages in the prior art desiccants, it is an object of my present invention to provide a desiccant in which deliquescent substance is permitted to reach a relatively high percentage of total saturation with moisture.

Another object of my present invention is to provide a desiccant capable of rapidly removing moisture from the atmosphere.

Another object of my invention is to provide a desiccant material which will not pack down when it is heavily laden with moisture so that relatively free air circulation is permitted through the material even after large quantities of moisture have been collected therein.

Another object of my invention is to provide a desiccant material composed of a combination of a deliquescent substance and expanded perlite particles, the expanded perlite particles having rough, fused surfaces interrupted by minute serrations to provide an extremely large amount of surface area on the expanded perlite particles upon which the moisture may be captured from the atmosphere and retained in the desiccant.

Another object of my invention is to provide a desiccant material composed of a deliquescent substance and expanded perlite particles having water impervious surfaces that include minute serrations over substantial areas, these serrations having an extremely high moisture affinity, and providing a very large surface area upon which moisture may be captured and retained.

Another object of my invention is to provide a desiccant which can be manufactured to reduce the percent relative humidity of the atmosphere in a container to any one of a plurality of given values.

Other objects and advantages of my present invention will be apparent from the following description and claims, the novelty consisting in the particular material ingredients and the relative proportioning and combining of these ingredients, all as more completely outlined herein, and is particularly pointed out in the appended claims.

In the accompanying drawings, forming a part of the present specification;

Figure 1:
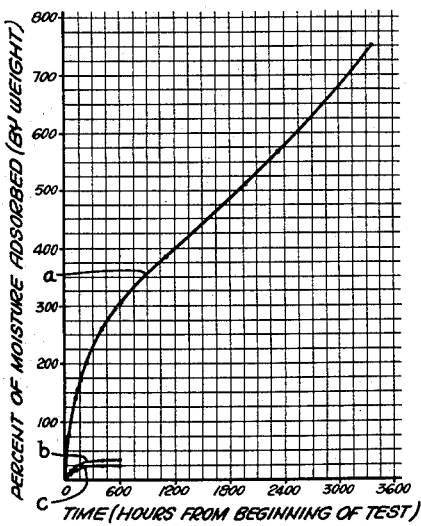
Figure 1 is a graph or chart showing the relative water absorption, by weight, of my desiccant and the nearest similar products that I have been able to find, for different periods of time.

My preferred composition of matter is a mechanical mixture of expanded perlite particles and a deliquescent material. My preferred deliquescent material is calcium chloride, which produces excellent results while at the same time being non-toxic and, in general, inert. My composition of matter which contains calcium chloride as the deliquescent substance will not irritate the human skin and will not cause ill effects if accidentally taken internally.

An alternative embodiment of my invention is a mechanical mixture of expanded perlite particles and potassium hydroxide. Although this embodiment of my invention may have slightly better moisture removing characteristics than my preferred embodiment as above set forth, the presence of potassium hydroxide renders it somewhat toxic, so that it is not as desirable as is my preferred embodiment for most commercial uses of my invention in which my composition of matter is used to remove moisture from the atmosphere. However, the use of potassium hydroxide in my composition of matter has proven to be the preferred form for combating acids and other harmful fumes.

The perlite which I use in my composition of matter is in the form of perlite particles which have been expanded by heat treatment. The expansion process, although forming no part of the present invention, generally includes heating the perlite particles at a temperature of above one thousand six hundred (1,600°) degrees Fahrenheit by the use of an intumescent furnace. However, it is to be understood that the expanded perlite particles may be processed in any conventional manner.

The expanded perlite particles which I use in my composition of matter are extremely light in weight, preferably on the order from about one (1) to about five (5) pounds per cubic foot, and the individual particles have fused surfaces that are impervious to moisture, so that all of the moisture will be retained on the surfaces of the particles, without being absorbed into the internal structure of the individual particles.

The surfaces of my perlite particles are rough and irregular, and are further interrupted by minute, substantially microscopic serrations which provide an extremely large surface area for each individual particle as compared with smooth or merely rough particles of comparable dimensions. The serrations on my expanded perlite particles are of a much smaller order of measurement than the irregularities on the particles, the serrations being minute and substantially microscopic, while the irregularities are visible to the naked eye. The minute serrations are disposed upon the rough, irregular surfaces of the particles, and might be said to be superpositioned on the rough, irregular particle surfaces. Not only do these minute serrations provide an extremely large surface area for each particle upon which the moisture and deliquescent material may be spread, to capture further moisture from the atmosphere, but the minute serrations have a particular moisture affinity which permits them to hold large quantities of moisture tightly.

I prefer to provide my expanded perlite particles within the particle size range of from U.S. No. 40 mesh to U.S. No. 60 mesh, a typical group of my expanded perlite particles within this range weighing 1.87 pounds per cubic foot.

As distinguished from my expanded perlite particles which have surfaces that are impervious to moisture, rough and minutely serrated, the pumice and other conventional carrier materials of most prior art desiccants have porous, water absorbent surfaces which do not have the serrations of my perlite particles. Pumice particles within my particle size range weigh between 38 and 40 pounds per cubic foot, which also adversely affects their operation, as hereinafter more fully pointed out.

The other type of prior art desiccant, which utilizes inert comminuted filler materials such as glass beads, quartz grains, asbestos, charcoal, or the like, utilizes these inert materials solely for the purpose of breaking up the fine, powdery physical state of the deliquescent materials used with them. However, they did not in any way enhance the ability of the deliquescent material to take on moisture, and had substantially no moisture carrying ability themselves, which prevented these prior art desiccants from taking on even as much water from the atmosphere as the type of prior art desiccant that utilized a porous carrier material.

My preferred method of manufacturing my composition of matter is to mechanically mix the calcium chloride or potassium hydroxide, or other deliquescent substance, with my particular expanded perlite particles having moisture impervious surfaces that are rough, irregular and serrated.

I will now describe the operation of my invention and the reasons for its striking superiority over all prior art desiccants, including both the porous filler type and the inert, glass bead filler type.

In its initial, dry state of composition, my desiccant is in a structural state determined primarily by the expanded perlite particles. The calcium chloride or potassium hydroxide is substantially uniformly distributed throughout the structure established by the expanded perlite particles, only about fifteen (15%) percent of the total volume occupied by the desiccant being caused by the presence of the deliquescent material because of the distribution of the deliquescent material throughout the expanded perlite particle structure.

The fused surfaces of my expanded perlite particles, which do not have pores therein, prevent the deliquescent material from being trapped in pores, and permit the deliquescent material to all be distributed over the surfaces of my expanded perlite particles, or between the perlite particles. Thus, the rate at which moisture is accumulated by the desiccant as a whole is not restricted by the concentration of the calcium chloride or potassium hydroxide at any particular points. Similarly, none of the calcium chloride or potassium hydroxide is trapped inside of pores behind water and other calcium chloride or potassium hydroxide so as to be kept completely out of contact with the atmosphere. Also, no vapor pressures build up within the particles to have any adverse effect on moisture adsorption.

The fused, moisture impervious surfaces of my expanded perlite particles prevent the absorption of moisture in the particles and the consequent breaking down of the particles when the desiccant contains a relatively large quantity of moisture. Thus, regardless of the amount of moisture which is taken on by the desiccant, the fused, moisture impervious nature of my expanded perlite particles gives my new desiccant sufficient structural strength to remain substantially in its initial shape. Regardless of how much moisture my desiccant contains, this retention of the initial structure permits air to circulate through the desiccant so that further moisture may be removed from the air.

The moisture which is taken on by my desiccant is retained on the surfaces of the expanded perlite particles by adsorption, which is the basis for capillary attraction. This surface moisture does not weaken the perlite particles in the manner that the absorbed moisture will weaken porous particles.

Prior art desiccants of both types, the porous carrier type and the solid, inert filler type such as the type that uses glass beads, have a strong tendency to form into clots which prevent air from reaching unused deliquescent material because of the extreme weight of both the porous and solid types of prior art carriers. This difference in weights is illustrated by the comparative densities of pumice and my expanded perlite particles as hereinabove set forth, and this difference is even greater, about twice as much, where solid, inert particles such as glass beads are used.

The great difference in operation between my desiccant and prior art desiccants of both the porous and solid carrier types, may be best understood by considering the nature of deliquescent substances. All of the ordinary desiccants rely for their ability to remove moisture from the atmosphere on the presence of a deliquescent substance in the desiccant. These deliquescent substances pick up moisture until they go into solution, and then continue to pick up moisture until the vapor pressure above the solution of the deliquescent material becomes substantially equal to the vapor pressure of the surrounding atmosphere. Calcium chloride and potassium hydroxide will take up many times their own weight in water depending on the vapor pressure of the surrounding atmosphere. The purpose in mixing the deliquescent substance with solid particles, such as the applicant's expanded perlite particles, the prior art porous particles, and the prior art solid, inert particles such as glass beads, is to produce a desiccant which will remain in the solid state even after substantial quantities of moisture have been absorbed from the atmosphere. Regardless of what type of particles are mixed with the deliquescent material, if the deliquescent material is sufficiently spread out and is at all times readily accessible to the atmosphere, it will continue to pick up moisture until the above described vapor pressure equilibrium is reached. However, this ideal situation has never been achieved when a quantity of solid, inert particles is mixed with the deliquescent material.

The deliquescent material in prior art desiccants employing porous particles is only able to collect a small fraction of the water which it could potentially collect out of the atmosphere because of the reasons stated above, i.e., because even though more moisture can be held in the solid form in the pores of the porous particles, this holding of the moisture in pores keeps some of the deliquescent material out of circulation in the pores, and the absorption of moisture in the pores causes the particles to break down and to form clots, preventing air circulation.

Similarly, the deliquescent material in prior art desiccants utilizing solid, inert separator particles, such as glass beads, is only able to collect a small fraction of the water which it could potentially collect out of the atmosphere, because such solid, inert particles will not hold substantial quantities of water on their surfaces, whereby the water drains off of these solid particles and puddles, or blocks the passages between the particles. These solid, inert particles are also extremely heavy, tending to clot and cling together once the powdered deliquescent material becomes moist. For these reasons, prior art desiccants using solid, inert filler materials such as glass beads do not perform as well as the prior art type of desiccants having porous particles, and most prior art desiccants were of the porous particle variety.

By combining my deliquescent material with my expanded perlite particles having surfaces that are impervious to moisture, rough and covered with minute serrations, I have produced a composition of matter which permits the deliquescent material contained therein to take on a far greater amount of moisture than the deliquescent material present in any of the prior art desiccants. The moisture impervious surfaces of my particles prevents moisture from being absorbed into the particles and thus prevents the particles from breaking down and becoming clogged together. For this reason, my combination produces far superior results to the prior art desiccants having porous particles.

Once the deliquescent material goes into solution in my combination, this solution becomes substantially uniformly distributed on the moisture imprevious, rough, minutely serrated surfaces of my expanded perlite particles. My expanded perlite particles have such extremely large surface areas due to the microscopic or minute serrations thereon, that when the deliquescent material solution becomes distributed on the surfaces of my particles, a surface of the solution of the deliquescent material which is vastly greater than the surface of the dry deliquescent material, or the surface of the deliquescent material as it would be if puddled, or the surface of the deliquescent material as contained in solution within the pores and chambers of a porous carrier, is presented to the humid air to be dried. On the other hand, there is no substantial improvement of the surface area of deliquescent material solution available where glass beads or other similar solid, inert carriers are used, over the surface of the dry deliquescent material or the puddled deliquescent material, and any increase in the surface area which might be present due to such solid, inert carriers such as glass beads would not even be as much an improvement as would be provided by porous particles.

It is thus apparent that the spectacular results obtained by my desiccant are dependent upon my use of my particular expanded perlite particles which have surfaces that are impervious to moisture, rough and substantially covered with minute serrations. I have found that expanded perlite particles of sizes ranging from U.S. mesh No. 40 to U.S. mesh No. 60 are the easiest expanded perlite particles to produce with my particular surface condition, which is the reason for my preferred range of particle sizes being from U.S. mesh No. 40 to U.S. mesh No. 60.

I have hereinbelow set forth a chart for my desiccant in which the components are a commercial grade of calcium chloride, which is calcium chloride in the substantially monohydrate form, with one molecule of water for each molecule of calcium chloride, and expanded perlite particles having surfaces that are impervious to moisture, rough and substantially covered with minute serrations, and of U.S. mesh No. 40 particle size. This chart shows the time required for saturation and the water adsorption by weight as a percentage of the weight of the desiccant used for a number of different mixtures, by weight, of the calcium chloride and expanded perlite particles. The mixture of calcium chloride and expanded perlite particles, in each instance, is designated by the percentage of the total weight of the desiccant which comprises the calcium chloride.

| Calcium Chloride by weight, percent | Hours of test to reach saturation | Amount of water taken on by weight, percent |
|---|---|---|
| 10.4 | 154 | 32 |
| 26.2 | 144 | 80 |
| 53.8 | 2,331 | 435 |
| 75.5 | 3,291 | 743 |
| 90.1 | 601 | 272 |
| 96.0 | 144 | 106 |

The above chart indicates that my desiccant in which 75.5 percent of the weight is calcium chloride produces the best results. The preferred range of compositions for my desiccant which I have derived from my above chart is from 26 percent by weight of the deliquescent material to 96 percent by weight of the deliquescent material. I have found that my desiccants in which other deliquescent materials beside calcium chloride are used, also fall within this preferred range.

My composition of matter which consists of potassium hydroxide and my expanded perlite particles is highly efficient in removing acid fumes from the atmosphere. Although the difficulties encountered in testing my composition of matter which contains potassium hydroxide have prevented me from making a chart similar to the above chart, I have determined that optimum results are obtained when 75.5 percent by weight of the desiccant is the common commercial grade of potassium hydroxide, using expanded perlite particles of U.S. mesh 40 particle size. Similarly, my preferred range in the desiccant containing potassium hydroxide is to use a composition having from 26 percent to 96 percent by weight of potassium hydroxide.

In tests of my preferred desiccant containing 75.5 percent by weight of potassium hydroxide, one pound of my desiccant was calculated to be capable of capturing 3.97 quarts of hydrochloric acid without pressure differential at sixty (60°) degrees Fahrenheit. This means that if the hydrochloric acid were to completely saturate the air sample (a condition far and beyond that which would ever be encountered commercially), the volume of gas or air which could be cleansed of hydrochloric acid would be 640 cubic feet. If, for example, the concentration of hydrochloric acid were one percent of saturation, then one pound of this preferred desiccant containing potassium hydroxide and my expanded perlite particles would cleanse sixty-four thousand (64,000) cubic feet of air. This desiccant is one hundred percent effective in the removal of hydrochloric acid fumes, and by the very nature of its ingredients, should likewise be one hundred percent efficient in removing any other acid fumes. It was noted in these tests that better performance of this desiccant containing potassium hydroxide occurs when the mixture is slightly damp than when it is dry.

Figure 2:
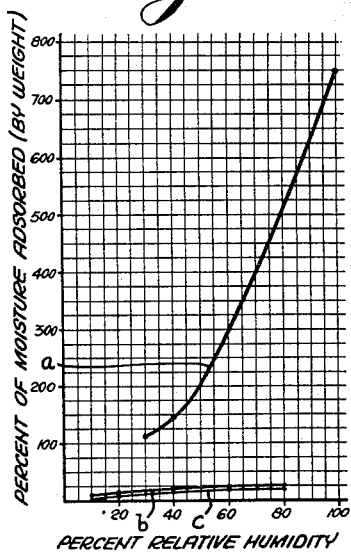
Figure 2 is a graph or chart comparing the amount of water absorbed by equal quantities of my desiccant and the nearest similar products that I have been able to find, for different percentages of relative humidity.

The high efficiency of my new composition of matter is graphically illustrated in the charts shown in Figures 1 and 2.

In Figure 1, the ordinates represent the weight of water taken on by the desiccant as a percentage of the original weight of the desiccant used and the abscissas represent the time in hours from the beginning of operation. Curve "a" was obtained from the preferred embodiment of my invention consisting of calcium chloride and expanded perlite particles in which the calcium chloride was of the commercial grade (predominantly in the monohydrate form) and comprised 75.5 percent of the total weight of the desiccant. Curve "b" was taken from a combination of any one of a number of bentonites, or silica gel, the best desiccants heretofore used, and curve "c" from a combination of commercial calcium chloride and any one of a number of silicas. It is to be noted that my desiccant illustrated in curve "a" will take on more than twenty-four (24) times as much water as any of the desiccants illustrated in either curve "b" or curve "c."

In Figure 2, the ordinates represent the weight of water taken on by the desiccant as a percentage of the original weight of the desiccant used, and the abscissas represent the percent relative humidity of the atmosphere surrounding the desiccant used. Curves "a," "b" and "c" in Figure 2 were obtained respectively from the same substances as curves "a," "b" and "c" in Figure 1. It is to be noted that in Figure 2 the fact that curve "a" is not plotted below a relative humidity of thirty (30%) percent does not indicate that my desiccant cannot attain humidities lower than 30 percent. My desiccant is capable of lowering the humidity of the surrounding atmosphere to as low as 0.17 percent.

Figure 3:
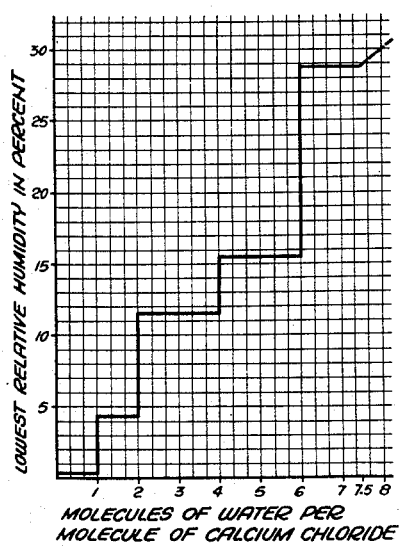
Figure 3 is a chart or graph showing the minimum values of the percent relative humidity obtainable in a closed compartment containing a form of my desiccant including expanded perlite particles and calcium chloride in its anhydrous and stable crystalline forms.

My desiccant comprising calcium chloride and my expanded perlite particles can be manufactured in such a way that it will reduce the relative humidity of a chamber to any one of five (5) different predetermined values, which values are shown as the ordinates of the graph in Figure 3 corresponding to the horizontal parts of the curve therein illustrated. The abscissas of this graph are the number of molecules of water for each molecule of calcium chloride in the sample thereof being used, this number of molecules of water being present in the calcium chloride provided in my desiccant as it is originally manufactured.

The principles which enable me to make a predetermined selection of the relative humidity which will be obtained in any chamber are that a molecule of calcium chloride will only form a stable chemical combination with 1, 2, 4 or 6 molecules of water and it will go into solution with over 7.5 molecules of water, and that if sufficient calcium chloride is provided in either the anhydrous or one of the other states, part of the moisture in the chamber will go toward producing calcium chloride in the next higher state of water content. The two forms of calcium chloride then present form a couple having a vapor pressure which corresponds to whatever couple it may be.

If anhydrous calcium chloride is used, it forms a couple having a vapor pressure of 0.04 millimeter of mercury at twenty-five (25°) degrees centigrade with calcium chloride combined with one molecule of water. When equilibrium is reached in the chamber, the vapor pressure of the water in the chamber will be 0.04 millimeter of mercury at twenty-five (25°) degrees centigrade, which corresponds to a relative humidity of 0.17 percent.

Similarly, if calcium chloride in combination with water is used in my desiccant, that will form a couple with calcium chloride in combination with two molecules of water. This couple has a vapor pressure of 1.0 millimeter of mercury at twenty-five (25°) degrees centigrade, corresponding to a relative humidity of 4.2 percent. For my desiccant formulas which contain calcium chloride having 2, 4 and 6 molecules of water, the respective humidities will be 11.4, 15.2 and 28.6 percent.

The prior combinations of a deliquescent material and a porous carrier could not be used to selectively attain a predetermined humidity in a chamber because of the fact that the deliquescent material was not uniformly exposed to the moist air so that a number of different couples resulted.

A further difficulty in prior combinations was that in order to increase the relative humidity of a chamber by a lesser amount, a smaller sample of the desiccant had to be used and allowed to become saturated with water. This lessened the over-all surface area of the desiccant and the desiccant acted only very slowly upon becoming saturated. Thus, the speed of operation of the desiccant was greatly decreased. In my invention five different relative humidities can be attained and the speed at which the desiccant collects the moisture can be controlled by merely varying the amount of my desiccant used, and hence varying its total surface area.

It was hereinabove indicated that for particle sizes of U.S. mesh number 40 pumice particles weigh between 38 and 40 pounds per cubic foot and solid, inert fillers such as glass beads weigh on the order of twice as much as pumice, while my expanded or exfoliated perlite particles weigh only 1.87 pounds per cubic foot. This great difference in the weights of prior porous and solid carriers and my perlite not only helps to prevent my desiccant from forming into clots when the desiccant becomes moist, but also greatly facilitates the handling of my desiccant. The lightness in weight of my desiccant, coupled with its extremely high moisture carrying capacity caused by the minute serrations on the moisture impervious surfaces of my perlite particles, permit a quantity of my desiccant to accomplish the results of the nearest competing desiccant although this quantity of my desiccant weighs only about one twenty-fourth (1/24) of the weight of this competing desiccant.

Another important advantage of my desiccant over prior art desiccants is the great saving in cost of my desiccant over the cost of other desiccants. As an example, one of the best desiccants now on the market sells retail for approximately one dollar and thirty ($1.30) cents and weighs twelve (12) ounces. A like performing quantity of my desiccant (weighing only one-half (1/2) of an ounce) will be able to sell for approximately six (6¢) cents, thus effecting more than a ninety-five (95%) percent saving in cost over this currently competive product.

For commercial use and consumption, my composition of matter may be provided in any suitable container which communicates with the surrounding atmosphere. Thus, a bag of porous paper or cloth may be used to contain my desiccant. Similarly, a perforated metal, plastic or wood container may be used. If it is desired, a glass bottle may be used to contain my desiccant and a cap having suitable air passages therein may be placed on the bottle.

My desiccant may be used to perform the same functions performed by any of the commonly used desiccants, and will perform these functions more efficiently. A typical use for my desiccant is to place a container of my desiccant inside of a space used for storing candy, pastries, dry breakfast foods, spinach or other similar products. Also, a container full of my desiccant can be placed adjacent any metal product in shipment or storage and it will protect the metal product from rust or tarnish. Likewise, a package of my dessicant can be placed in a container of plaster and it will prevent pre-setting of the plaster during storage or shipment.

My desiccant can similarly be used in mortuary products, such as caskets, where the use of my desiccant will protect the caskets during storage before use, and will reassure relatives that the casket will remain intact for the maximum possible period of time after interment.

Another valuable use of my invention is to control odor and mildew in clothing which is used in damp climates. Frequently, in warm, damp climates, clothing will mildew and be ruined overnight. The use of my desiccant adjacent to such clothing will protect the clothing from such damage.

Similarly, my desiccant can be placed adjacent to valuable documents and it will protect them from oxidation of the ink on these documents.

A most valuable use of my desiccant, and particularly of my desiccant embodiment consisting of potassium hydroxide and my expanded perlite particles is to collect fumes of acid and other harmful fumes. This use of my invention is more completely described hereinabove.

A further use of my desiccant is to provide a small package thereof within a container which can be closed to keep out the moisture of the atmosphere. A hearing aid can be placed within this container during the night while the owner thereof is sleeping, and all of the moisture that has condensed on the parts of the hearing aid will be removed. In this manner, the bothersome static which is caused by this moisture can be eliminated.

Other items can be similarly placed in the container and dried, if desired.

It is to be understood that many other uses and advantages are inherent in my invention, and that the form of my invention herein shown and described is my preferred embodiment and that various changes in the proportions may be resorted to without departing from the spirit of my invention or the scope of the appended claims.

I claim:

1. A desiccant composition consisting essentially of expanded perlite particles that have surfaces which are impervious to moisture, irregular, and serrated, and have a deliquescent substance which comprises from 26 percent to 96 percent of the total weight of the said desiccant.

2. A desiccant composition consisting essentially of expanded perlite particles that have surfaces which are impervious to moisture, irregular, and serrated, and sufficient calcium chloride to constitute from 26 percent to 96 percent of the total weight of the said desiccant.

3. A desiccant composition consisting essentially of expanded perlite particles that have surfaces which are impervious to moisture, irregular, and serrated, and a deliquescent substance which comprises from 26 percent to 96 percent of the total weight of the said desiccant, the particle size of said perlite particles being in the range of from U.S. No. 40 mesh to U.S. No. 60 mesh.

4. A desiccant composition consisting essentially of expanded perlite particles that have surfaces which are impervious to moisture, irregular, and serrated, and sufficient potassium hydroxide to constitute from 26 percent to 96 percent of the total weight of the said desiccant.

References Cited in the file of this patent

UNITED STATES PATENTS

| | | |
|---|---|---|
| 2,241,600 | Hunsicker | May 13, 1941 |
| 2,284,987 | Martin et al. | June 2, 1942 |
| 2,625,516 | Metzger et al. | Jan. 13, 1953 |
| 2,626,864 | Miscall et al. | Jan. 27, 1953 |
| 2,720,492 | Ehman | Oct. 11, 1955 |

FOREIGN PATENTS

| | | |
|---|---|---|
| 448,359 | Great Britain | June 8, 1936 |
| 602,422 | Great Britain | May 26, 1948 |

OTHER REFERENCES

Calif. J. of Mines and Geology, vol. 44, No. 3, page 308 (July 1948), pub. by Calif. Div. of Mines, San Francisco, Calif.

Greenough: Cleveland Plain Dealer, August 12, 1949.